United States Patent
Huval et al.

(10) Patent No.: US 8,191,586 B2
(45) Date of Patent: Jun. 5, 2012

(54) AUTOMATED APPARATUS AND METHOD FOR TIRE PRESSURE MAINTENANCE

(75) Inventors: Thomas Keith Huval, Breaux Bridge, LA (US); Kirk Ryan Landry, Breaux Bridge, LA (US)

(73) Assignee: Lydi, LLC, Breaux Bridge, LA (US)

(*) Notice: Subject to any disclaimer, the term of this patent is extended or adjusted under 35 U.S.C. 154(b) by 1080 days.

(21) Appl. No.: 12/148,664

(22) Filed: Apr. 21, 2008

(65) Prior Publication Data

US 2009/0260710 A1    Oct. 22, 2009

(51) Int. Cl.
*B60C 23/02* (2006.01)
*B65B 31/00* (2006.01)

(52) U.S. Cl. .............. 141/38; 141/4; 141/95; 152/415

(58) Field of Classification Search ............ 141/4, 38, 141/95; 152/415
See application file for complete search history.

(56) References Cited

U.S. PATENT DOCUMENTS

| | | | |
|---|---|---|---|
| 4,333,491 A | 6/1982 | Knubley | |
| 4,456,038 A | 6/1984 | Gwaltney et al. | |
| 4,694,409 A | 9/1987 | Lehman | |
| 4,875,509 A * | 10/1989 | Da Silva | 141/38 |
| 4,905,742 A | 3/1990 | Mohs | |
| 5,244,027 A * | 9/1993 | Freigang | 152/416 |
| 5,429,166 A * | 7/1995 | Anzai et al. | 152/415 |
| 5,518,021 A | 5/1996 | Loureiro Benimeli | |
| 5,611,875 A | 3/1997 | Bachhuber | |
| 5,629,874 A * | 5/1997 | Mittal | 152/415 |
| 5,709,295 A * | 1/1998 | Johnson | 194/350 |
| 5,891,277 A | 4/1999 | Bachhuber | |
| 6,067,850 A | 5/2000 | Lang et al. | |
| 6,170,542 B1 | 1/2001 | Loureiro Benimeli | |
| 6,868,719 B1 * | 3/2005 | Claussen et al. | 73/146.2 |
| 7,076,386 B2 | 7/2006 | Forti | |
| 7,430,900 B2 * | 10/2008 | Belanger | 73/146 |
| 7,556,478 B2 * | 7/2009 | Klein et al. | 417/44.2 |
| 7,975,731 B2 * | 7/2011 | Shultz et al. | 141/38 |
| 2003/0040843 A1 | 2/2003 | Forti | |
| 2004/0003865 A1 * | 1/2004 | Skoff | 141/38 |

* cited by examiner

*Primary Examiner* — Gregory Huson
*Assistant Examiner* — Nicolas A Arnett
(74) *Attorney, Agent, or Firm* — Jones Walker

(57) ABSTRACT

A device and method for tire air pressure maintenance with a compressor. The device includes a manifold having an input from the compressor and an output, and wherein the output is in pressure communication with the tire and an air chuck for clamping onto the tires, wherein the air chuck is in pressure communication with the manifold. The device also comprises an air pressure sensor, operatively associated with the manifold, for monitoring changes of pressure within the manifold and generating a data signal. A processor, operatively associated with the manifold, for processing changes in pressure is included, and wherein the processor receives the data signal. The device further includes a bleeder line operatively attached to the manifold, and an actuator valve operatively associated with the bleeder line, and wherein the actuator valve is operatively attached to the processor, and wherein the processor is capable of generating a low pressure command signal to open the actuator valve.

12 Claims, 6 Drawing Sheets

AUTOMATED APPARATUS AND METHOD FOR TIRE PRESSURE MAINTENANCE

FIELD OF THE INVENTION

This invention relates to a device for inflating tires. More specifically, but without limitation, this invention relates to a device and method for automating the inflation of automobile tires.

BACKGROUND OF THE INVENTION

A very important safety aspect of automobile maintenance is the proper inflation of the tires. As those of ordinary skill in the art will appreciate, under pressured tires and over-pressured tires result in significant problems such as accelerated wear and poor responsiveness. These problems may cause, for example, several personal injury accidents from a blow-out or premature tire replacement.

Most consumers are not skilled or trained in determining when air pressure in an automobile tire is under-inflated or over-inflated. Hence, these types of air pressure maintenance issues go undetected until the tire is seriously under-inflated or over-inflated. It should be noted that as used herein, the term automobile refers to a car, truck, sports utility vehicle, all terrain vehicle, motorcycle or bicycle.

Today's automobile manufacturers are incorporating sensor devices that detect and alert the driver as to low tire air pressures.

Prior art devices are very cumbersome and awkward to use. Additionally, the prior art designs contribute to consumers shunning their use. Prior art devices tend to rely on the consumer being able to read the pressure gauge and the consumer knowing when to stop inflation. However, the prior art designs simply exacerbate the problem because it leads to over-inflation. Additionally, prior art devices are poorly placed at filing stations. The end result is that most consumers do not check the inflation on their tires in a timely manner and even when they do, the tires remain either under-pressured or over-pressured.

Therefore, there is a need for an automated device for tire pressure maintenance. There is also a need for a device and method that will conveniently and efficiently check on air pressure level in automobile tires. There is also a need for a device and method that will either inflate or deflate the automobile tire automatically based on an accurate pressure reading. There is a need for a tire pressure maintenance device that can be easily used while filling an automobile with fuel (i.e. gasoline, diesel, etc). These needs, as well as many other needs, will be met by the following disclosure.

SUMMARY OF THE INVENTION

In a first preferred embodiment, a device for inflating a plurality of tires on an automobile with a compressor is disclosed. The device comprises a manifold having an input line from the compressor and an output line, and wherein the output line is in pressure communication with the tire and a first air chuck for clamping onto the tires, and wherein the first air chuck is in pressure communication with the manifold. The device also comprises an air pressure sensor means, operatively associated with the manifold, for monitoring changes of pressure within the manifold and generating a data signal and a processor means, operatively associated with the manifold, for processing changes in pressure, and wherein the processor means receives the data signal.

The device further includes a bleeder line operatively attached to the manifold, and a first actuator valve operatively associated with the bleeder line, and wherein the first actuator valve is operatively attached to the processor means, and wherein the processor means is capable of generating a low pressure command signal to open the first actuator valve. The device may also contain a second actuator valve operatively associated with the input line, and wherein the processor means is capable of generating a high pressure command signal to open the second actuator valve. A first dispenser is included, and wherein the first dispenser is operatively associated with the output line at a hydrocarbon pumping station, and wherein the first dispenser has attached thereto the first air chuck, and wherein the first dispenser is rotatively mounted to inflate the tires on a first side of the automobile.

The device may further comprise a second dispenser operatively associated with the output line at a hydrocarbon pumping station, and a second air chuck for clamping onto the tires, wherein the second dispenser has attached thereto the second air chuck and wherein the second dispenser is rotatively mounted to inflate the tires on a second side of the automobile.

The device may further contain alarm means, operatively associated with the processor means, for determining when a predetermined air pressure has been achieved. In one embodiment, the air pressure sensor means includes a first air sensor for detecting a predetermined high pressure setting and a second air sensor for detecting a predetermined low pressure setting. Also, the processor means includes a key pad for pressure data entry by a customer and a LED screen for pressure data readout from the processor means. The processor means, keypad, LED screen, and alarm may be packaged together in a control unit.

In a second preferred embodiment, an apparatus at a hydrocarbon pumping station for inflating tires with a compressor is disclosed. The apparatus comprises a manifold having an input line from the compressor and an output line, and wherein the output line is in pressure communication with the tire, and a first air chuck for clamping onto the tires, wherein the first air chuck is in pressure communication with the output line. The device also includes an air pressure sensor means, operatively associated with the manifold, for monitoring changes of pressure within the manifold and generating a data signal. A processor means, operatively associated with the manifold, for processing changes in pressure is also included, and wherein the processor means receives the data signal. The apparatus in this embodiment also includes a first dispenser operatively associated with the output line, and wherein the first dispenser has attached thereto the first air chuck, and wherein the first dispenser is rotatively mounted to the hydrocarbon pumping station in order to inflate the tires on the automobile.

A method of automatic tire pressure maintenance is also disclosed. The method includes having a consumer inputting a desired air pressure into the processor means via the key pad, the manifold is filled to the desired pressure, and the air pressure sensor will detect an actual air pressure within the tire with an air pressure sensor once the air chuck is clamped to the tire valve. The processor means will determine whether the tire pressure is to high or to low based on the sensor readings. The method will allow air pressure into the tire if the tire pressure is to low or release air pressure out of the tire if the tire pressure is too high.

An advantage of the present disclosure is the automation of the filling of the tire with the proper air pressure or the releasing of air from the tire. Another advantage of the present invention includes a precise measurement of the tire pressure.

Yet another advantage is the automated process of insuring the proper amount of air. Still yet another advantage is the ability to have two dispensers, controlled from a single control unit. Another advantage is that the apparatus can be located at a hydrocarbon pumping station for the ease and efficiency of the user who is filling his (or hers) automobile with fuel. In this way, the user is at the gas pump, and the system can automatically fill (or release) the tire with the proper air pressure according to the teachings of the present disclosure; all the user has to do is select the air pressure setting and engage the air chuck.

A feature of the present disclosure is the manifold which is operatively attached to a compressor, wherein the manifold contains an inlet attached to the compressor and an outlet connected to the tire. Another feature is the air pressure sensor means that are attached to the manifold. Yet another feature is the processor means which receives, stores, and processes the incoming pressure data and then generates command output signals. Another feature is the actuator valves, responsive to the command output signals from the processor means, for allowing air pressure into or out of the manifold. Another feature is that the dispensers may be mounted to a hydrocarbon pumping station.

DETAILED DESCRIPTION OF THE PREFERRED EMBODIMENTS

Figure 1:
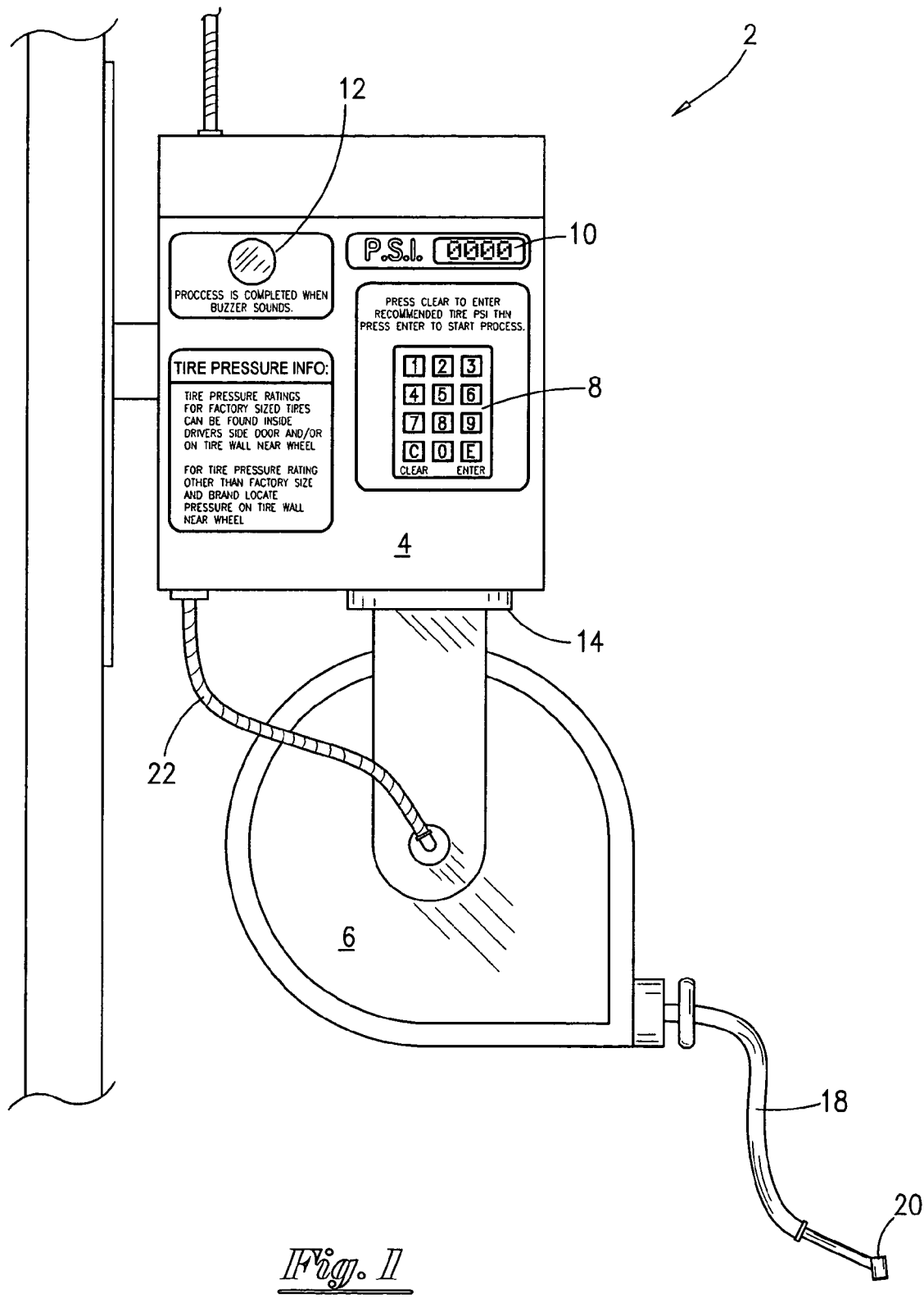
FIG. 1 is a schematic illustration of the present apparatus including control unit with a first dispenser.

Referring now to FIG. 1, a schematic illustration of the present apparatus 2 including control unit 4 with a first air reel dispenser 6. The control unit 4 is a box like structure capable of being mounted. For instance, control unit 4 can be mounted to a pole. The control unit 4 will contain a keypad 8 for the consumer to input the desired air pressure, generally in pounds per square inch (psi) as well understood by those of ordinary skill in the art. The control unit 4 also contains the light-emitting diode read-out (LED) 10 that will display inputted data, as well as displaying generated data, such as "desired pressure level achieved". The control unit 4 also houses the processor means (not seen in this view) for storing and processing the pressure data which is generated as per the teachings of this disclosure. The control unit 4 has an audible alarm means 12 operatively associated therewith, and wherein the audible alarm means determines when a predetermined air pressure has been achieved. In the preferred embodiment of FIG. 1, the processor means, key pad, LED screen, and alarm are packaged together in a control unit.

The control unit 4 will have attached thereto a swivel bracket 14 for the air reel dispenser 6. With the swivel bracket 14, the consumer can rotate the dispenser 6 as required for specific use because the dispenser 6 is rotatively mounted. The air reel dispenser 6 will have the rolled-up air hose 18 so that consumers can roll-out the air hose 18 for use; and after use, the dispenser 6 will roll-back the air hose 18 for convenient storage. The air chuck 20 is connected at a first end to the air hose 18. The air chuck 20 will clamp onto the tire valve and open the tire valve, as well understood by those of ordinary skill in the art. FIG. 1 also depicts the stainless steel braided hose 22, wherein the braided hose 22 communicates the pressurized air to the air hose 18.

Figure 2:
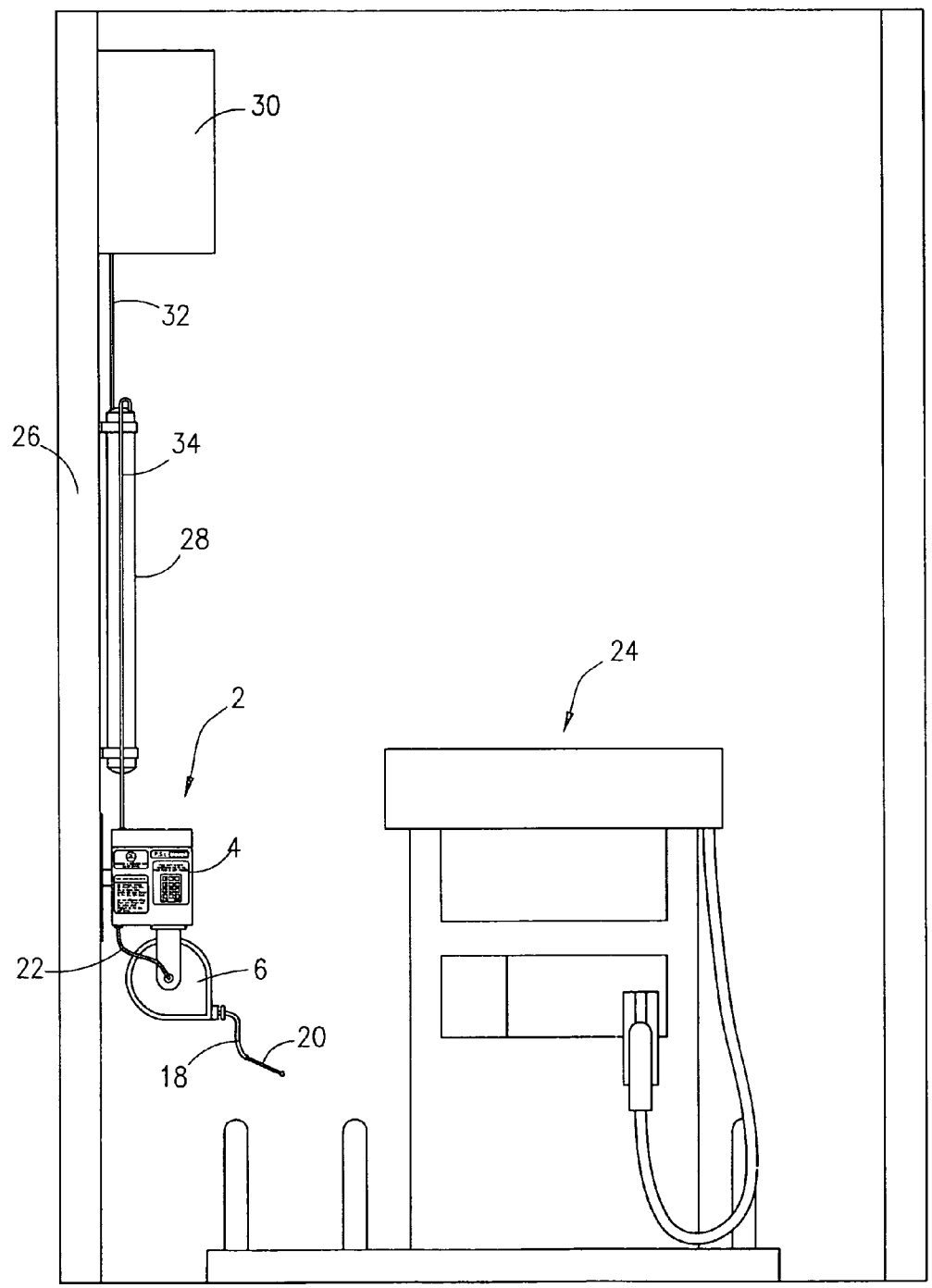
FIG. 2 is a schematic illustration of a first preferred embodiment of the present apparatus including control unit with the first dispenser disposed within a fueling station.

Referring now to FIG. 2, a schematic illustration of a first preferred embodiment of the present apparatus 2 including control unit 4 with first dispenser 6 disposed within a fueling station (fueling station seen generally at 24). The fueling station 24 is also referred to as a hydrocarbon pumping station 24. It should be noted that like numerals appearing in the various figures refer to like components. FIG. 2 depicts the control unit 4 mounted to the pole 26. Also shown in FIG. 2 is the volume tank 28 and wherein the volume tank 28 is connected to the compressor 30 via a stainless steel supply line 32. The stainless steel supply line 34 connects the volume tank 28 to the control unit 4. The volume tank 28 is optional and is included to reduce compressor run time.

Hence, in FIG. 2, an automobile pulls-up to the fueling station 24, and the consumer exits the automobile. The consumer would then take the air chuck 20, unreel the air hose 18, and clamp the air chuck 20 onto the tire valve. The automated filling of the tire with air pressure or alternatively, the releasing of pressure from the tire, as per the teachings of the present invention, would then occur.

Figure 3:
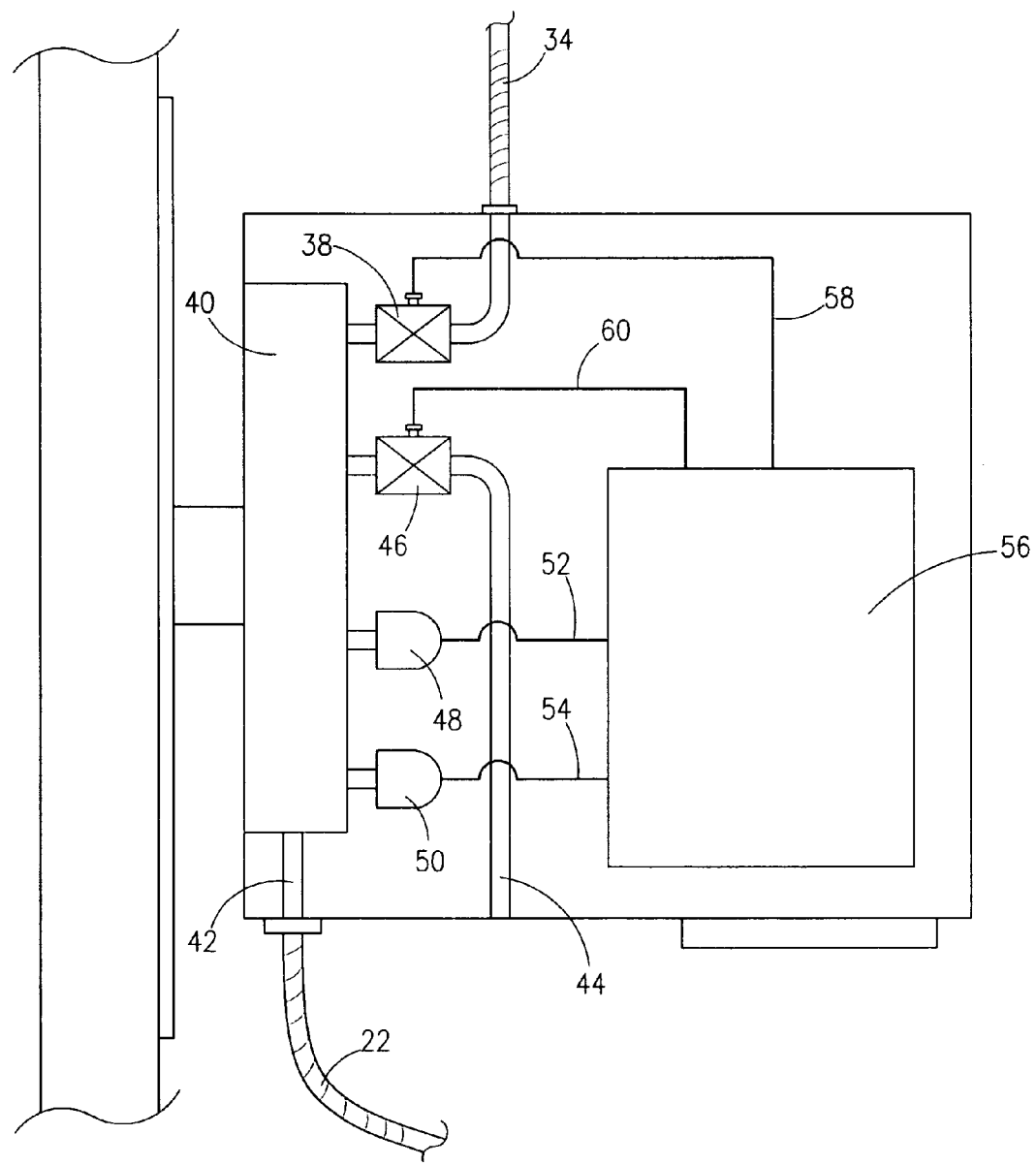
FIG. 3 is a block diagram of the processor and pneumatic components for automatic tire pressure maintenance.

FIG. 3 is a block diagram of the process and pneumatic components from the preferred apparatus for automatic tire pressure maintenance. FIG. 3 depicts the air supply line 34 from the volume tank 28 (or alternatively, directly from the compressor) directed to an actuator valve 38, wherein the actuator valve 38 has an open and closed position. It should be noted that the air supply line 34 can be directly connected to the air compressor. The actuator valves are normally in the closed position. The actuator valve 38 controls communication with the manifold 40 and supply line 34. Hence, the air supply line 34 represents the air pressure input to the manifold. The manifold 40 contains the output line 42; more specifically, output line 42 is connected to the braided hose 22, which in turn is connected to the air hose 18 (as seen in FIG. 1). Returning to FIG. 3, a bleeder line 44 leads from the manifold 40. An actuator valve 46 is operatively associated with the bleeder line 44, and wherein the actuator valve 46 has an open and closed positioned so that in the open position, air pressure from the manifold 40 can escape (bleed-down) via bleeder line 44.

FIG. 3 also depicts air pressure sensor means for detecting the air pressure within the manifold 40. In the preferred embodiment of FIG. 3, a first air pressure sensor 48 for detecting a high air pressure within the manifold and generating a signal and a second air pressure sensor 50 for detecting a low air pressure within the manifold and generating a signal is disclosed. The signal generated by the sensor 48 is transmitted on the hard wire 52 and the signal generated by the sensor 50 is transmitted on the hard wire 54.

As per the teachings of the present disclosure, the signals generated by the pressure sensors 48 and 50 will be directed to the processor means 56 for receiving, storing, processing, and generating output signal commands. The processor means 56 may be a micro-processor.

In the case where the pressure sensor reading is a low pressure, the processor means 56 receives and decodes the generated pressure signal from sensor 50 and the processor means 56 will generate an output command signal via hard wire 58, and wherein the hard wire 58 is electrically connected to the actuator valve 38. The output command signal will cause the actuator valve 38 to open thereby allowing air pressure inside of the manifold 40. In the case where the sensor reading is a high pressure within the manifold 40, the processor means receives and decodes the pressure signal from sensor 48 and the processor means 56 will generate an output command signal via hard wire 60, and wherein the hard wire 60 is electrically connected to the actuator valve 46. The actuator valve 46 will open thereby allowing air pressure to escape from the manifold 40.

Figure 4:
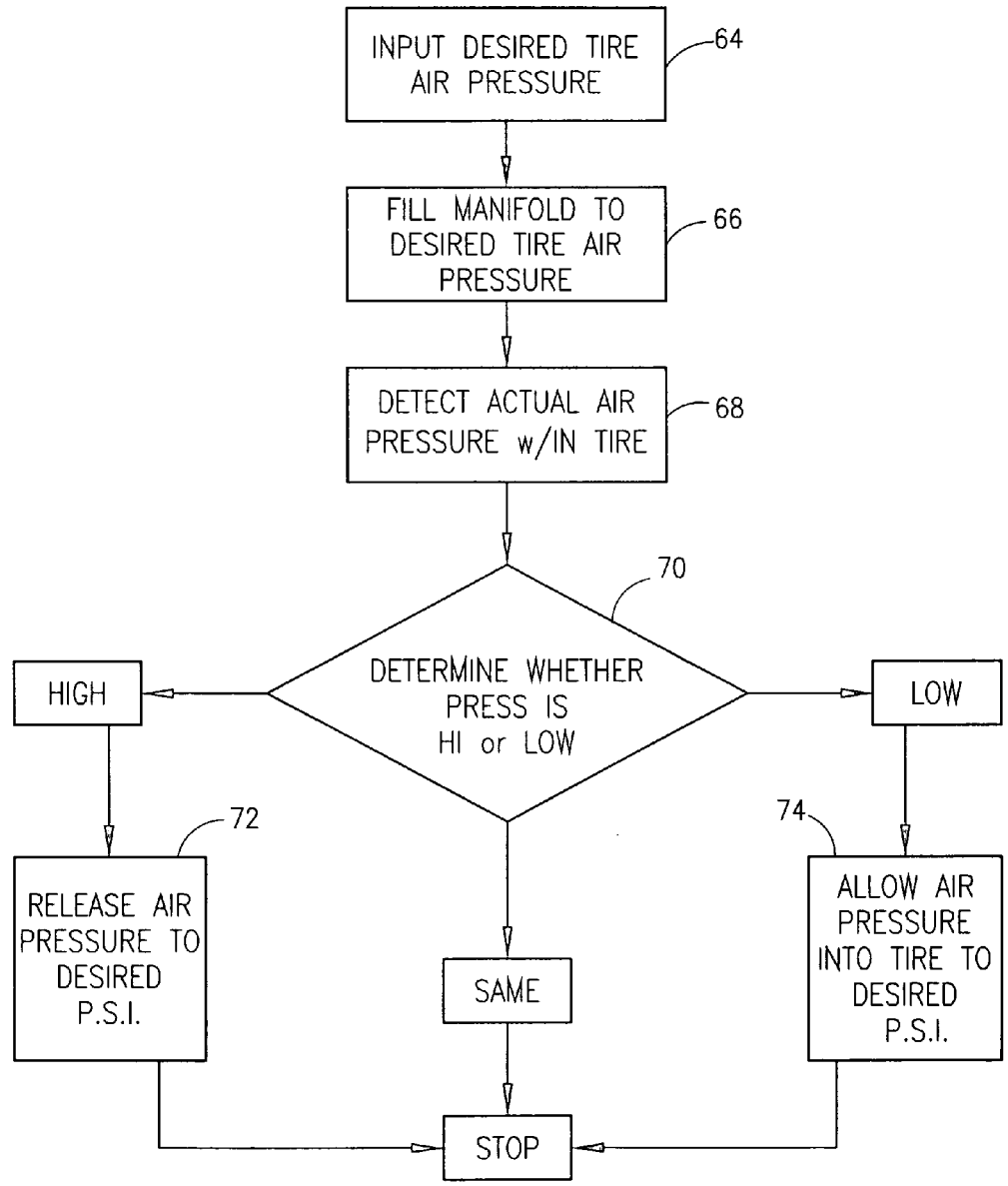
FIG. 4 is a flow diagram of the automated method for tire pressure maintenance.

Referring now to FIG. 4, a flow diagram of a preferred embodiment of an automated method for tire pressure maintenance will now be described. A consumer will input a desired air pressure into the processor means via the key pad (step 64); next, the manifold is generally filled to the desired pressure (step 66); and an air pressure sensor means will detect an actual air pressure within the tire with the air pressure sensor means once the air chuck is clamped to the tire valve (step 68). The processor means will determine whether the tire pressure is to high or to low based on the pressure sensor means readings (step 70). The method will allow air pressure into the tire if the tire pressure is to low (step 72) or release air pressure out of the tire if the tire pressure is too high (step 74).

As previously described, in the most preferred embodiment, air pressure is detected by conducting tire air pressure to the manifold and measuring air pressure within manifold via air pressure signals that are then sent to the processor means. Air pressure is allowed into the tire when the air pressure sensor transmits a first data signal to the processor means and the processor means directs a first valve to release pressure from the manifold into the tire. Air pressure is allowed to be released from the tire by the air pressure sensor transmitting a second data signal to the processor means and the processor means directs a second valve to allow pressure out of the manifold. According to the teachings of the present disclosure, the step of inputting the desired air pressure may include the processor means determining an acceptable pressure range so that a user can not input unacceptable tire pressure values. Also, an audible alarm may be generated once the desired tire pressure is achieved.

Figure 5:
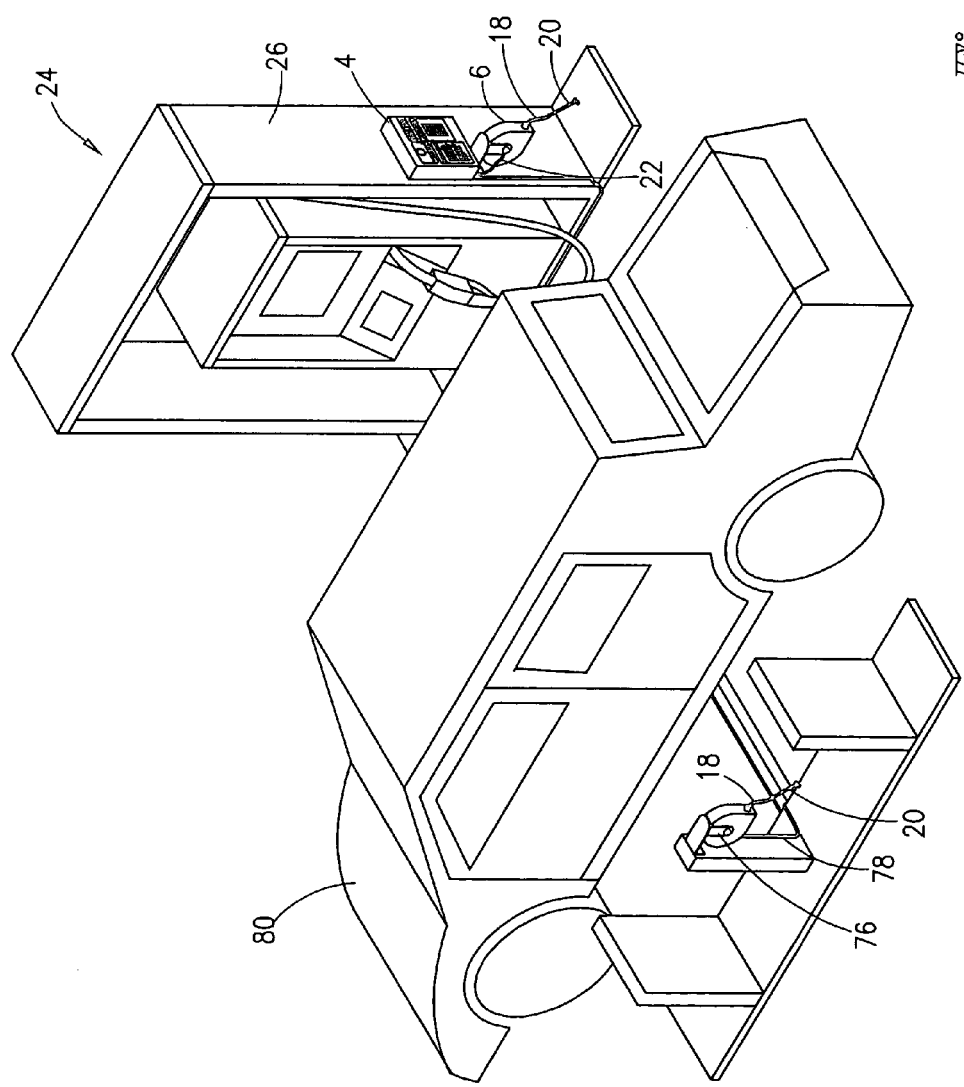
FIG. 5 is a perspective illustration of a fuel station with a second preferred embodiment of the disclosed apparatus.

FIG. 5 is a perspective illustration of the hydrocarbon pumping station 24 with a second preferred embodiment of the disclosed apparatus. FIG. 5 is illustrative of the ease and efficiency of utilizing the disclosed system. More specifically, FIG. 5 depicts the first dispenser 6 which is operatively connected to the control unit 4, and wherein the control unit 4 is mounted to pole 26. In the second preferred embodiment illustrated in FIG. 5, a second air reel dispenser 76 is included, and wherein the second air reel dispenser 76 is in communication with the control unit 4 via the stain steel braided hose 78. A mat protective covering overlays the hose 78. In this way, a consumer can fill both the right and left side tires of the automobile 80 (it should be noted that the automobile is shown in partial view). According to the teachings of the present disclosure, it is possible to use a single processor means in order to control operation of both dispensers, namely dispensers 6 and 76. The method of utilizing the apparatus remains the same with the second embodiment illustrated in FIG. 5.

Figure 6:
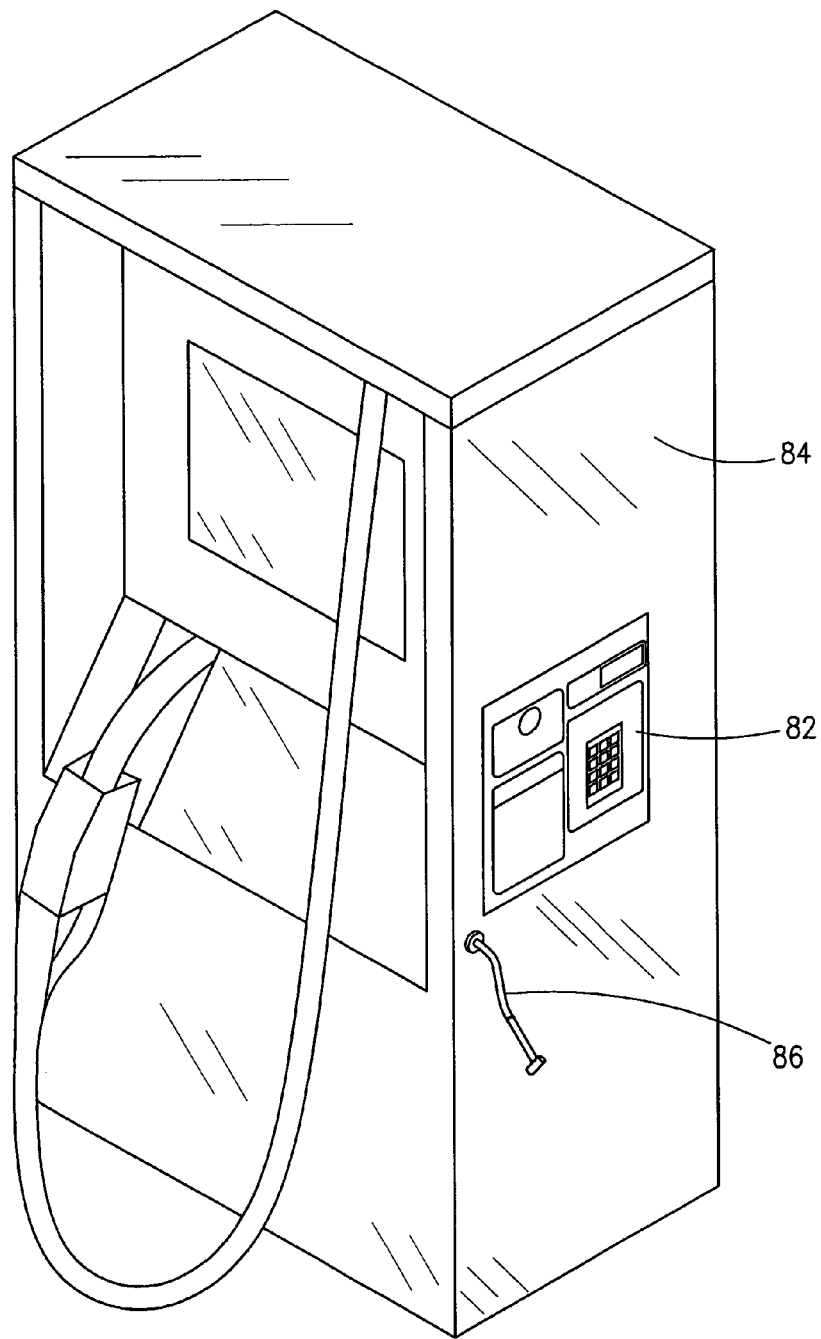
FIG. 6 is a perspective illustration of a third preferred embodiment of the disclosed apparatus.

Referring now to FIG. 6, a perspective illustration of a third preferred embodiment of this disclosure will be described. More specifically, this embodiment has the control unit 82 attached to side 84. The air reel dispenser is located within side 84, and therefore, not seen in this embodiment. However, the air hose 86 leading from the inner air reel dispenser is shown. The tire pressure maintenance device can be easily used by consumers while filling an automobile with fuel.

The nature of the present invention, as well as several ways for inputting it into practice have been disclosed with the present description, it should be appreciated that many modification thereto will become apparent to those skilled in the art to which it pertains without deviation from the spirit of the disclosure as defined by the scope of the claims and any equivalents thereof.

What is claimed is:

1. An apparatus at a hydrocarbon pumping station for inflating tires with a compressor, the tires mounted on an automobile, wherein the apparatus comprises:
a control unit affixed to the hydrocarbon pumping station and housing a manifold, an air pressure sensor means, and a processor means, said control unit including a swivel bracket;
said manifold having an input line from the compressor and an output line, and wherein said output line is in pressure communication with the tire;
a first air chuck for clamping onto the tires, wherein said first air chuck is in pressure communication with said output line;
said air pressure sensor means being operatively associated with said manifold to monitor changes of pressure within said manifold and to generate a data signal;
said processor means being operatively associated with said manifold to process changes in pressure, and wherein said processor means receives said data signal;
a first dispenser operatively associated with said output line, and wherein said first dispenser has attached thereto said first air chuck, and wherein said first dispenser is rotatively mounted to the control unit via said swivel bracket to inflate the tires on a first side of the automobile.

2. The apparatus of claim 1 further comprising:
a bleeder line housed in said control unit and being operatively attached to said manifold;
a first actuator valve housed within said control unit and being operatively associated with said bleeder line, and wherein said first actuator valve is operatively attached to said processor means, and wherein said processor means is capable of generating a low pressure command signal to open said first actuator valve.

3. The apparatus of claim 2 further comprising a second actuator valve housed within said control unit and being operatively associated with said input line, and wherein said processor means is capable of generating a high pressure command signal to open said second actuator valve.

4. The apparatus of claim 3 further comprising an alarm means housed within said control unit and being operatively associated with the processor means to determine when a predetermined air pressure has been achieved.

5. The apparatus of claim 4 further comprising a second dispenser operatively associated with said output line, and a second air chuck for clamping onto the tires, said second dispenser has attached thereto said second air chuck and wherein said second dispenser is rotatively mounted to the hydrocarbon pumping station to inflate the tires on a second side of the automobile.

6. The apparatus of claim 1 wherein said air pressure sensor means includes a first air sensor for detecting a predetermined high pressure setting and a second air sensor for detecting a predetermined low pressure setting within said manifold.

7. The apparatus of claim 6 wherein said processor means includes a key pad for data entry by a customer and a LED screen for data readout from the processor means, wherein said control unit contains said key pad and said LED screen.

8. A method of automatically filing an automobile tire with air comprising:
   a) providing an apparatus at a hydrocarbon pumping station for inflating tires with a compressor, the tires mounted on an automobile, wherein the apparatus comprises: a control unit affixed to the hydrocarbon pumping station and housing a manifold, an air pressure sensor means, and a processor means, said control unit including a swivel bracket; said manifold having an input line from the compressor and an output line, and wherein said output line is in pressure communication with the tire; a first air chuck for clamping onto the tires, wherein said first air chuck is in pressure communication with said output line; said air pressure sensor means being operatively associated with said manifold to monitor changes of pressure within said manifold and to generate a data signal; said processor means being operatively associated with said manifold to process changes in pressure, and wherein said processor means receives said data signal; a first dispenser operatively associated with said output line, and wherein said first dispenser has attached thereto said first air chuck, and wherein said first dispenser is rotatively mounted to the control unit via said swivel bracket to inflate the tires on a first side of the automobile;
   b) inputting a desired air pressure into said processor means;
   c) filling said manifold to the desired pressure;
   d) detecting an actual air pressure within the tire with said air pressure sensor means;
   e) determining whether the tire pressure is to high or to low with said processor means;
   f) allowing air pressure from the manifold into the tire if the tire pressure is to low;
   g) releasing air pressure out of the tire if the tire pressure is too high;
   wherein air pressure is detected by conducting air pressure from the tire to the manifold and measuring air pressure within the manifold via said data signal from the air pressure sensors means that are sent to said processor means.

9. The method of claim 8 wherein air pressure from the manifold is allowed into the tire when the air pressure sensor means transmits a first data signal to the processor means and the processor means directs a first valve to release pressure from the manifold into the tire.

10. The method of claim 9 wherein releasing air pressure from the tire is allowed by the air pressure sensor means transmitting a second data signal to the processor means and the processor means directs a second valve to allow pressure out of the manifold.

11. The method of claim 10 wherein the step of inputting the desired air pressure includes the processor means determining an acceptable pressure range.

12. The method of claim 11 wherein said apparatus includes an alarm means housed within said control unit and being operatively associated with the processor means to determine when a predetermined air pressure has been achieved and the method further comprises the step of generating an audible alarm once the desired tire pressure is achieved.

* * * * *